(12) United States Patent
Zapico Alvarez et al.

US011590734B2

(10) Patent No.: US 11,590,734 B2
(45) Date of Patent: *Feb. 28, 2023

(54) HOT-DIP COATED STEEL SHEET

(71) Applicant: ArcelorMittal, Luxembourg (LU)

(72) Inventors: David Zapico Alvarez, Metz (FR);
Florence Bertrand, Scy-Chazelles
(FR); Joris Giroux, Metz (FR)

(73) Assignee: ArcelorMittal, Luxembourg (LU)

( * ) Notice: Subject to any disclaimer, the term of this patent is extended or adjusted under 35 U.S.C. 154(b) by 394 days.

This patent is subject to a terminal disclaimer.

(21) Appl. No.: 16/760,426

(22) PCT Filed: Oct. 19, 2018

(86) PCT No.: PCT/IB2018/058138
  § 371 (c)(1),
  (2) Date: Apr. 29, 2020

(87) PCT Pub. No.: WO2019/092526
  PCT Pub. Date: May 16, 2019

(65) Prior Publication Data
  US 2020/0338857 A1    Oct. 29, 2020

(30) Foreign Application Priority Data

Nov. 8, 2017 (WO) .................. PCT/IB2017/001351

(51) Int. Cl.
| | |
|---|---|
| *B32B 15/01* | (2006.01) |
| *C21D 9/46* | (2006.01) |
| *C21D 6/00* | (2006.01) |
| *C21D 1/76* | (2006.01) |
| *C22C 21/10* | (2006.01) |
| *C22C 18/04* | (2006.01) |
| *C23C 2/02* | (2006.01) |
| *C23C 2/06* | (2006.01) |
| *C22C 38/00* | (2006.01) |
| *C22C 38/02* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |
| *C23C 2/12* | (2006.01) |
| *C23C 2/40* | (2006.01) |

(Continued)

(52) U.S. Cl.
  CPC .......... *B32B 15/013* (2013.01); *B32B 15/012* (2013.01); *C21D 1/76* (2013.01); *C21D 6/002* (2013.01); *C21D 6/004* (2013.01); *C21D 6/005* (2013.01); *C21D 6/008* (2013.01); *C21D 9/0062* (2013.01); *C21D 9/46* (2013.01); *C21D 9/561* (2013.01); *C21D 9/573* (2013.01); *C22C 18/04* (2013.01); *C22C 21/00* (2013.01); *C22C 21/02* (2013.01); *C22C 21/06* (2013.01); *C22C 21/10* (2013.01); *C22C 38/001* (2013.01); *C22C 38/002* (2013.01); *C22C 38/02* (2013.01); *C22C 38/06* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/06* (2013.01); *C23C 2/12* (2013.01); *C23C 2/26* (2013.01); *C23C 2/28* (2013.01); *C23C 2/40* (2013.01); *C23C 28/321* (2013.01); *C23C 28/345* (2013.01)

(58) Field of Classification Search
  CPC ....... B32B 15/012; B32B 15/013; C21D 1/76; C21D 6/002; C21D 6/004; C21D 6/005; C21D 6/008; C21D 9/0062; C21D 9/46; C21D 9/561; C21D 9/573; C23C 2/02; C23C 2/06; C23C 2/12; C23C 2/26; C23C 2/28; C23C 2/40; C23C 28/321; C23C 28/34; C22C 18/04; C22C 21/00; C22C 2/02; C22C 21/06; C22C 21/10; C22C 38/001; C22C 38/002; C22C 38/02; C22C 38/06; C22C 38/38; C22C 38/42; C22C 38/44; C22C 38/46; C22C 38/48; C22C 38/50; C22C 38/54; C22C 38/58
  See application file for complete search history.

(56) References Cited

U.S. PATENT DOCUMENTS

| | | |
|---|---|---|
| 6,635,359 B1 | 10/2003 | Kurosaki et al. |
| 11,001,918 B2 | 5/2021 | Kim et al. |

(Continued)

FOREIGN PATENT DOCUMENTS

| | | |
|---|---|---|
| EP | 1225246 A1 | 7/2002 |
| EP | 2415896 A1 | 2/2012 |

(Continued)

OTHER PUBLICATIONS

See International Search Report of PCT/IB2018/058138, dated Jan. 25, 2019.

*Primary Examiner* — Jenny R Wu
(74) *Attorney, Agent, or Firm* — Davidson, Davidson & Kappel, LLC

(57) ABSTRACT

The present invention relates to a method for the manufacture of a hot-dip coated steel sheet coated with a zinc or an aluminum based coating including the provision of a specific steel sheet, a recrystallization annealing with specific heating, soaking and cooling sub-steps using an inert gas and a hot-dip coating; the hot dip coated steel sheet and the use of the hot-dip coated steel sheet.

15 Claims, 1 Drawing Sheet

(51) Int. Cl.
*C21D 9/56* (2006.01)
*C22C 21/00* (2006.01)
*C21D 9/573* (2006.01)
*C22C 21/02* (2006.01)
*C22C 21/06* (2006.01)
*C22C 38/38* (2006.01)
*C23C 2/26* (2006.01)
*C23C 28/00* (2006.01)
*C23C 2/28* (2006.01)
*C21D 9/00* (2006.01)

(56) References Cited

U.S. PATENT DOCUMENTS

| | | |
|---|---|---|
| 2008/0083477 A1 | 4/2008 | Drillet et al. |
| 2010/0186854 A1 | 7/2010 | Bertrand et al. |
| 2016/0160309 A1 | 6/2016 | Allain et al. |

FOREIGN PATENT DOCUMENTS

| | | |
|---|---|---|
| EP | 3017073 B1 | 8/2017 |
| EP | 3216886 A1 | 9/2017 |
| JP | 2000212648 A | 8/2000 |
| JP | 2006233333 A | 9/2006 |
| JP | 2008156734 A | 7/2008 |
| JP | 2010534278 A | 11/2010 |
| JP | 2011117040 A | 6/2011 |
| JP | 2011153367 A | 8/2011 |
| JP | 2011219778 A | 11/2011 |
| JP | 2013136809 A | 7/2013 |
| JP | 5434537 B2 | 3/2014 |
| JP | 2015504976 A | 2/2015 |
| JP | 2017048412 A | 3/2017 |
| JP | WO2017154494 A1 | 9/2017 |
| KR | 20160033783 A | 3/2016 |
| RU | 2418094 | 5/2011 |
| RU | 2566131 C1 | 10/2015 |

HOT-DIP COATED STEEL SHEET

The present invention relates to a method for the manufacture of a hot-dip coated steel sheet and a hot-dip coated steel sheet. The invention is particularly well suited for the automotive industry.

BACKGROUND

With a view of saving the weight of vehicles, it is known to use high strength steels for the manufacture of automobile vehicle. For example for the manufacture of structural parts, mechanical properties of such steels have to be improved. It is known to add alloying elements to improve the mechanical properties of the steel. Thus, high strength steels or ultra-high strength steels having high mechanical properties including TRIP (Transformation-Induced Plasticity) steel, DP (Dual Phase) steels, HSLA (High-Strength Low Alloyed), TRIPLEX, and DUPLEX are produced and used.

Usually, DP steels have a ferritic-martensitic microstructure. This results in a microstructure consisting of a soft ferrite matrix containing islands of martensite as the secondary phase (martensite increases the tensile strength). The overall behavior of DP steels is governed by among others the phases' volume fraction and morphology (grain size, aspect, ratio, etc.), in addition to the steel chemical composition. DP steels have high ultimate tensile strength (UTS, enabled by the martensite) combined with low initial yield stress (provided by the ferrite phase) and high early-stage strain hardening. These features render DP steels ideal materials for automotive-related sheet forming operations.

Their advantages are: low yield strength, low yield to tensile strength ratio, high initial strain hardening rates, good uniform elongation, a high strain rate sensitivity and good fatigue resistance.

Usually, these steels are coated with a metallic coating improving properties such as corrosion resistance and phosphatability. The metallic coatings can be deposited by hot-dip coating after the annealing of the steel sheets. However, for these steels, during the annealing performed in a continuous galvanizing line, the alloying elements having higher affinity towards oxygen (compared to iron) such as Manganese (Mn), Aluminum (Al), Silicon (Si) or Chromium (Cr) oxidize and lead to the formation of oxides at the surface. These oxides being for example manganese oxide (MnO) or silicon oxide ($SiO_2$) can be present in the form of a continuous film on the surface of the steel sheet or in the form of discontinuous nodules or small patches. They prevent the proper adherence of the metallic coating to be applied and can result in zones in which there is no coating on the final product or problems related to the delamination of the coating.

The patent application EP2415896 discloses a method for manufacturing a high-strength galvanized steel sheet including a zinc plating layer, having a mass per unit area of 20 $g/m^2$ to 120 $g/m^2$, disposed on a steel sheet containing 0.01% to 0.18% C, 0.02% to 2.0% Si, 1.0% to 3.0% Mn, 0.001% to 1.0% Al, 0.005% to 0.060% P, and 0.01% or less S on a mass basis, the remainder being Fe and unavoidable impurities, includes annealing and galvanizing the steel sheet in a continuous galvanizing line. A temperature region with a furnace temperature of A° C. to B° C. is performed at an atmosphere dew-point temperature of −5° C. or higher in a heating process, where 600≤A≤780 and 800≤B≤900. The dew-point temperature of the atmosphere in the annealing furnace other than a region from A° C. to B° C. is not particularly limited and is preferably within a range from −50° C. to −10° C.

A high-strength galvanized steel sheet obtained by the above method has a texture or microstructure in which an oxide of at least one or more selected from the group consisting of Fe, Si, Mn, Al, P, B, Nb, Ti, Cr, Mo, Cu, and Ni is formed in a surface portion of a steel sheet that lies directly under a plating layer and that is within 100 µm from a surface of a base steel sheet at 0.010 $g/m^2$ to 0.50 $g/m^2$ per unit area and a crystalline Si oxide, a crystalline Mn oxide, or a crystalline Si—Mn complex oxide is precipitated in base metal grains that are present in a region within 10 µm down from the plating layer and that are within 1 µm from grain boundaries.

However, by using the above method, there is a risk that an important layer of external oxide such as FeO is formed at the steel sheet surface. In this case, it is difficult to reduce all the external oxide leading to a bad wettability and a bad coating adhesion of the zinc on the steel surface.

The patent application JP2008156734 discloses a method for manufacturing a high-strength hot-dip galvanized steel sheet comprising:

subjecting a steel to hot rolling, pickling and cold rolling, and subjecting the resultant steel sheet to hot-dip galvanizing treatment to manufacture the hot-dip galvanized steel sheet, wherein in the hot rolling, a slab heating temperature is set at 1150 to 1300° C., a finish rolling temperature is set at 850 to 950° C., and a coiling temperature is set at 400 to 600° C.;

in the pickling, a bath temperature is set at 10° C. or higher and lower than 100° C., and a concentration of hydrochloric acid is set at 1 to 20%; and in the hot-dip galvanizing treatment, a hydrogen concentration in an atmosphere in a heat treatment furnace from a temperature-rising process to 600° C. or higher to a cooling process to 450° C. via an annealing temperature is set at 2 to 20% and a dew point of the atmosphere is set at −60 to −10° C., and the cold-rolled steel sheet is kept at the annealing temperature of 760 to 860° C. for 10 to 500 seconds, and then cooled at an average cooling rate of 1 to 30° C./sec.

It also discloses a high-strength hot-dip galvanized steel sheet comprising: by mass %, 0.03 to 0.12% C, 0.01 to 1.0% Si, 1.5 to 2.5% Mn, 0.001 to 0.05% P, 0.0001 to 0.005% S, 0.005 to 0.15% Al, 0.001 to 0.01% N, 0.01 to 0.5% Cr, 0.005 to 0.05% Ti, 0.005 to 0.05% Nb, 0.005 to 0.5% V, 0.0003 to 0.0030% B, with the balance being Fe and unavoidable impurities; and having a structure including a ferrite phase having an average crystal grain size of 10 µm or less and a martensite phase having a volume fraction of 30 to 90%, wherein a ratio of hardness of a surface layer of a sheet thickness to hardness of a center of the sheet thickness is 0.6 to 1, the maximum depth of cracks and recesses extending from an interface between a plating layer and the steel sheet to an inside of the steel sheet is 0 to 20 µm, and furthermore, an area ratio of a flat portion other than the cracks and the recesses is 60% to 100%.

It is mentioned that in the inside of the steels sheet, Si-based and Mn-based oxides are formed in the crystal grain boundaries and the grains.

However, by using the above method with the steel composition, a bad wettability and a bad coating adhesion of the zinc can be obtained since the oxides are close to the steel sheet surface. Thus, there is a risk that the presence of such oxides forms a discontinuous oxides film in the steel sheet.

The patent application JP2000212648 discloses an one stage method for producing a high-strength hot-dip galvanized steel sheet with excellent workability and plating adhesiveness, the method comprising the steps of: subjecting a steel slab comprising 0.10 wt % or less of P to hot rolling followed by pickling, or otherwise subjecting the steel slab to cold rolling;

heating in an atmosphere where a heating temperature T is 750° C. or more and 1000° C. or less and satisfies the following formula (2), a dew point t of an atmosphere gas satisfies the following formula (3) and a hydrogen concentration of an atmosphere gas is 1 to 100 vol %; and then subjecting to hot-dip galvanization:

$$0.85 \leq \{[P(wt\%)+(2/3)]*1150\}/\{T(°C.)\} \leq 1.15 \quad (2);$$

$$0.35 \leq \{[P(wt\%)+(2/3)]*(-30)\}/\{t(°C.)\} \leq 1.8 \quad (3).$$

All the examples of JP2000212648 wherein the one stage heat treatment method is performed (Examples 18-26) include a heat reduction treatment where a heating temperature T is 810 and 850° C. with a dew point very dry (−35° C.) or very humid (35° C.) allowing the coating adhesion.

The only comparative example of the one stage method of JP2000212648 (Comparative Example 10) is performed with a steel sheet having very low amounts of Si and Cr. In this case, the one stage heat treatment method includes a heat reduction treatment where a heating temperature of 820° C. with a dew point of 0° C. However, P-based oxides were not reduced leading to a bad coating adhesion.

The patent application JP2011153367 discloses a method for producing a galvannealed steel comprising an annealing, a hot-dip galvanizing, and an alloying treatment on a steel sheet comprising, in terms of mass %, C: 0.03 to 0.20%, Mn: 0.03 to 3.0%, Si: 0.1 to 2.5%, S: 0.01% or less, P: 0.1% or less, sol. Al: 1.0% or less, N: 0.01% or less, and Bi: 0.0001 to 0.05%, in heating up to a recrystallization temperature in the annealing, the annealing is performed to the recrystallization temperature with a dew point of −25 to 0° C. in an annealing furnace during heating in the range of at least 650° C. to the recrystallization temperature.

However, the presence of Bismuth in the steel can decrease the mechanical properties of steel. Moreover, there is a risk to decrease the wettability and the coating adhesion of high strength steels and ultra-high strength steels.

Additionally, as shown in FIG. 1 of the patent application JP2011153367, the method starts by a purge of the furnace with a N$_2$-10 vol. % H$_2$ gas having a dew point of −60° C. The gas is changed to a predetermined high dew point gas at the start of heating. Indeed, when the sheet temperature reached 650° C., the furnace is again purged with a high dew point gas having a predetermined dew point, e.g. −10° C. After that, when the sheet temperature reached 860° C., which is equal to or higher than the recrystallization temperature, the gas is again switched to the initial low-dew point gas, i.e. −60° C., before the temperature of the sheet is immersed in a plating bath reached 460° C.

Thus, the method requires three purges:
one when starting the method with a gas having a dew point of −60° C.,
one during the annealing when the steel sheet temperature reaches 650° C. with a gas having a dew point of −10° C. and
another one during the annealing when the steel sheet temperature reaches 850° C. with a gas having a low dew point gas of −60° C.

This method is very difficult to manage in industrial scale, especially in a continuous annealing line.

Thus, in addition to the recrystallization annealing method, the chemical composition and the steel microstructure, the oxides nature and the oxides repartition which are formed during the recrystallization annealing are also important characteristics to take into account to improve the wettability and the coating adhesion of DP steels.

SUMMARY OF THE INVENTION

Consequently, there is a need to find a way to improve the wetting and the coating adhesion of high strength steels and ultra-high strength steels, in particular DP steels comprising a certain amount of alloying elements.

It is an object of the present invention to provide a hot-dip coated steel sheet having a chemical composition including alloying elements, wherein the wetting and the coating adhesion is highly improved. Another alternate or additional object is to provide an easy to implement method for the manufacture of said coated metallic sheet.

The present invention provides for the manufacture of a hot-dip coated steel sheet coated with a zinc or an aluminum based coating, comprising:

A. The provision of a steel sheet having the following chemical composition in weight percent:
  0.05≤C≤0.20%,
  1.5≤Mn≤3.0%,
  0.10≤Si≤0.45%,
  0.10≤Cr≤0.60%,
    Al≤0.20%,
    V<0.005%
  and on a purely optional basis, one or more elements such as
    P<0.04%,
    Nb≤0.05%,
    B≤0.003%,
    Mo≤0.20%,
    Ni≤0.1%,
    Ti≤0.06%,
    S≤0.01%
    Cu≤0.1%,
    Co≤0.1%,
    N≤0.01%,
the remainder of the composition being made of iron and inevitable impurities resulting from the elaboration, B. The recrystallization annealing of said steel sheet in a full radiant tube furnace comprising a heating section, a soaking section, a cooling section, optionally an equalizing section comprising the sub-following steps:
  i. the heating of said steel sheet from ambient temperature to a temperature T1 between 700 and 900° C. in the heating section having an atmosphere A1 comprising from 0.1 to 15% by volume of H$_2$ and an inert gas whose a dew point DP1 is between −18° C. and +8° C.,
  ii. the soaking of the steel sheet from T1 to a temperature T2 between 700 and 900° C. in the soaking section having an atmosphere A2 identical to A1 with a dew point DP2 equal to DP1,
  iii. the cooling of the steel sheet from T2 to T3 between 400 and 700° C. in the cooling section having an atmosphere A3 comprising from 1 to 30% H$_2$ by volume and an inert gas whose a dew point DP3 is below or equal to −30° C.,
  iv. optionally, the equalizing of the steel sheet from a temperature T3 to a temperature T4 between 400 and 700° C. in the equalizing section having an atmosphere A4 comprising from 1 to 30% $H_2$ by volume and an inert gas whose a dew point DP4 is below or equal to −30° C. and C. The hot-dip coating of the annealed steel sheet in a bath based on zinc or based on aluminum.

A hot-dip coated steel sheet obtainable from the method and a use of the steel sheet for manufacture as a part in an automotive vehicle are also provided.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figure.

DETAILED DESCRIPTION

The following terms will be defined:
"vol. %" means the percentage by volume,
"wt. %" means the percentage by weight.

The invention relates to a method for the manufacture of a hot-dip coated steel sheet coating with a zinc or an aluminum based coating, comprising:

A. The provision of a steel sheet having the following chemical composition in weight percent:
0.05≤C≤0.20%,
1.5≤Mn≤3.0%,
0.10≤Si≤0.45%,
0.10≤Cr≤0.60%,
Al≤0.20%,
V<0.005%
and on a purely optional basis, one or more elements such as
P<0.04%,
Nb≤0.05%,
B≤0.003%,
Mo≤0.20%,
Ni≤0.1%,
Ti≤0.06%,
S≤0.01%
Cu≤0.1%,
Co≤0.1%,
N≤0.01%,
the remainder of the composition being made of iron and inevitable impurities resulting from the elaboration, B. The recrystallization annealing of said steel sheet in a full radiant tube furnace comprising a heating section, a soaking section, a cooling section, optionally an equalizing section comprising the sub-following steps:

i. the heating of said steel sheet from ambient temperature to a temperature T1 between 700 and 900° C. in the heating section having an atmosphere A1 comprising from 0.1 to 15% by volume of $H_2$ and an inert gas whose a dew point DP1 is between −18° C. and +8° C., ii. the soaking of the steel sheet from T1 to a temperature T2 between 700 and 900° C. in the soaking section having an atmosphere A2 identical to A1 with a dew point DP2 equal to DP1, iii. the cooling of the steel sheet from T2 to T3 between 400 and 700° C. in the cooling section having an atmosphere A3 comprising from 1 to 30% $H_2$ by volume and an inert gas whose a dew point DP3 is below or equal to −30° C., iv. optionally, the equalizing of the steel sheet from a temperature T3 to a temperature T4 between 400 and 700° C. in the equalizing section having an atmosphere A4 comprising from 1 to 30% $H_2$ by volume and an inert gas whose a dew point DP4 is below or equal to −30° C. and C. The hot-dip coating of the annealed steel sheet in a bath based on zinc or based on aluminum.

Figure 1:
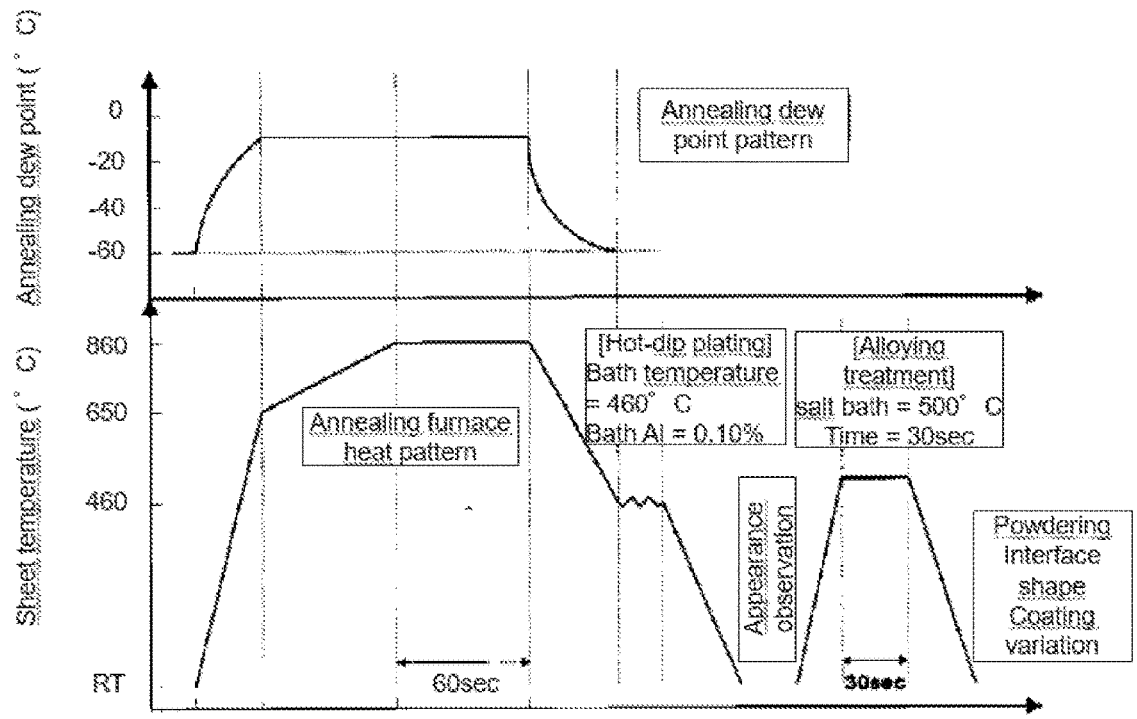
FIG. 1 illustrates one method of the prior art disclosed in the patent application JP2011153367.
Figure 2:
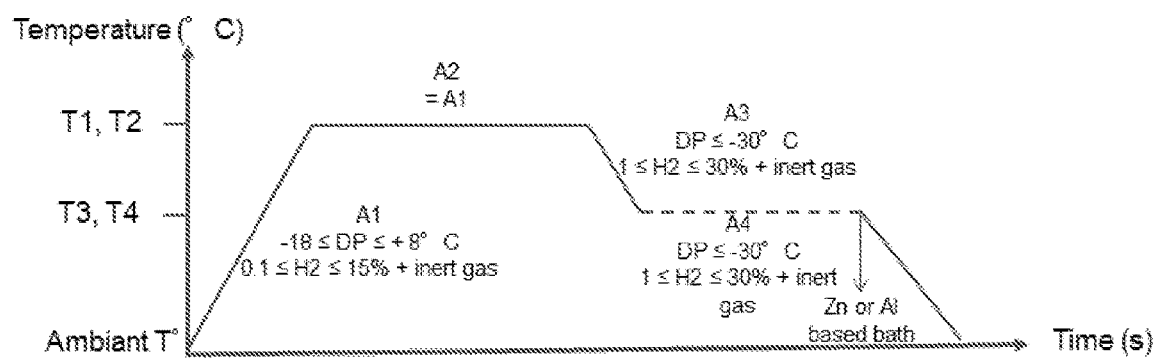
FIG. 2 illustrates one example of the method according to the present invention.

Without willing to be bound by any theory, it seems that the method according to the present invention allows for a high improvement of the wettability and the coating adhesion of the steel sheet having a specific chemical composition. Indeed, on the contrary to prior art methods such as the one disclosed in JP2011153367 (FIG. 1) and as illustrated in FIG. 2, the inventors have found that the recrystallization annealing according to the present invention performed in a full Radiant Tube Furnace (RTF) wherein the heating and soaking section have the same atmosphere with DP being −18° C. and +8° C., such atmosphere comprising from 0.1 to 15% by volume of $H_2$ allows for the production of a hot-dip coated steel sheet having a specific oxides repartition allowing a high wettability and coating adhesion. In particular, the oxides including MnO, FeO and $Mn_2SiO_4$ are formed during the recrystallization annealing externally at the steel sheet surface and also internally allowing a high wettability and coating adhesion. Preferably, the external oxides are present in form of nodules at the sheet sheet surface.

If the recrystallization annealing of the above specific steel sheet is not performed according to the present invention, in particular if the heating and soaking sections do not have the same atmosphere and if the dew point is below −18° C., there is a risk to form oxides such as MnO, FeO and $Mn_2SiO_4$, such oxides being mainly or only external. Moreover, there is a risk that these oxides form a thick continuous layer at the steel sheet surface decreasing significantly the wettability and the coating adhesion of the steel sheets.

Moreover, if the heating and soaking sections do not have the same atmosphere and if the dew point is above 8° C., there is a risk to form external oxides MnO and FeO and internal oxide such as $Mn_2SiO_4$. Especially, there is a risk that MnO and mainly FeO are formed in a form of a continuous layer at the steel sheet surface decreasing the wettability and the coating adhesion of the steel sheet.

Regarding the chemical composition of the steel, the carbon amount is between 0.05 and 0.20% by weight. If the carbon content is below 0.05%, there is a risk that the tensile strength is insufficient. Furthermore, if the steel microstructure contains retained austenite, its stability which is necessary for achieving sufficient elongation, can be not obtained. In a preferred embodiment, the carbon content is in the range between 0.05 and 0.15%.

Manganese is a solid solution hardening element which contributes to obtain high tensile strength. Such effect is obtained when Mn content is at least 1.5% in weight. However, above 3.0%, Mn addition can contribute to the formation of a structure with excessively marked segregated zones which can adversely affect the welds mechanical properties. Preferably, the manganese content is in the range between 1.5 and 2.9% to achieve these effects. This makes it possible to obtain satisfactory mechanical strength without increasing the difficulty of industrial fabrication of the steel and without increasing the hardenability in the welds.

Silicon must be comprised between 0.1 and 0.45%, preferably between 0.1 to 0.30% and more preferably between 0.1 to 0.25% by weight of Si to achieve the requested combination of mechanical properties and weldability: silicon reduces the carbides precipitation during the annealing after cold rolling of the sheet, due to its low solubility in cementite and due to the fact that this element increases the activity of carbon in austenite. It seems that if Si amount is above 0.45%, other oxides are formed at the steel sheet surface decreasing the wettability and the coating adhesion.

Aluminum must be below or equal to 0.20%, preferably below 0.18 by weight. With respect to the stabilization of retained austenite, aluminum has an influence that is relatively similar to the one of the silicon. However, aluminum content higher than 0.20% in weight would increase the Ac3 temperature, i.e. the temperature of complete transformation into austenite in the steel during the annealing step and would therefore make the industrial process more expensive.

Chromium makes it possible to delay the formation of pro-eutectoid ferrite during the cooling step after holding at the maximal temperature during the annealing cycle, making it possible to achieve higher strength level. Thus, the chromium content is between 0.10 and 0.60%, preferably between 0.10 and 0.50% by weight for reasons of cost and for preventing excessive hardening.

Vanadium also plays an important role within the context of the invention. According to the present invention, the amount of V is below 0.005% and preferably $0.0001 \leq V \leq 0.005\%$. Preferably, V forms precipitates achieving hardening and strengthening.

The steels may optionally contain elements such as P, Nb, B, Mo, Ni, Ti, S, Cu, Co, N achieving precipitation hardening.

P and S are considered as a residual element resulting from the steelmaking. P can be present in an amount <0.04% by weight. S can present in an amount below or equal to 0.01% by weight.

Titanium and Niobium are also elements that may optionally be used to achieve hardening and strengthening by forming precipitates. However, when the Nb amount is above 0.05% and/or Ti content is greater than 0.06%, there is a risk that an excessive precipitation may cause a reduction in toughness, which has to be avoided.

The steels may also optionally contain boron in quantity comprised below or equal to 0.003%. By segregating at the grain boundary, B decreases the grain boundary energy and is thus beneficial for increasing the resistance to liquid metal embrittlement.

Molybdenum in quantity below or equal to 0.2% is efficient for increasing the hardenability and stabilizing the retained austenite since this element delays the decomposition of austenite.

The steel may optionally contain nickel, in quantity below or equal to 0.1% so to improve the toughness.

Copper can be present with a content below or equal to 0.1% for hardening the steel by precipitation of copper metal.

Preferably, the chemical composition of the steel does not include Bismuth (Bi). Indeed, without willing to be bound by any theory, it is believed that if the steel sheet comprises Bi, the wettability decreases and therefore the coating adhesion.

Preferably, in steps B.i) and B.ii), A1 comprises between 1 and 10% by volume of H2 and more preferably, A1 comprises between 2 and 8% by volume of H2, A2 being identical to A1.

Advantageously, in steps B.i) and B.ii), DP1 is between −15° C. and +5° C., and more preferably, DP1 is between −10 and +5° C., DP2 being equal to DP1.

In a preferred embodiment, in step B.i), the steel sheet is heated from ambient temperature to T1 with a heating rate above 1° C. per second and for example between 2 and 5° C. per second.

Preferably, in step B.i), the heating is performed during a time t1 between 1 and 500 seconds and advantageously between 1 and 300 s.

Advantageously, in step B.ii), the soaking is performed during a time t2 between 1 and 500 seconds and advantageously between 1 and 300 s.

Preferably, in step B.ii), T2 is equal to T1. In this case, in steps B.i) and B.ii), T1 and T2 are between 750 and 850° C., T2 being equal to T1. In another embodiment, it is possible that T2 is below or above T1 depending on the steel sheet chemical composition and microstructure. In this case, in steps B.i) and B.ii), T1 and T2 are between 750 and 850° C. independently from each other.

Preferably, in step B.iii), A3 comprises from 1 to 20% by weight of H2 and more preferably, from 1 to 10% by weight of H2.

Preferably, in step B.iii), DP3 is below or equal to −35° C.

In a preferred embodiment, in step B.iii), the cooling is performed during a time t3 between 1 and 50 seconds.

Advantageously, in step B.iii), the cooling rate is above 10° C. per second and preferably between 15 and 40° C. per second.

Advantageously, in step B.iv), A4 comprises from 1 to 20% and more preferably, from 1 to 10% by weight of H2.

Preferably, in step B.iv), DP4 is below or equal to −35° C.

In a preferred embodiment, in step B.iv), the equalizing is performed during a time t4 between 1 and 100 seconds and for example between 20 and 60 seconds.

Advantageously, in steps B.iii) and B.iv), A3 is identical to A4, DP4 being equal to DP3.

Preferably, in step B.iv), T4 is equal to T3. In this case, in steps B.iii) and B.iv), T3 and T4 are between 400 and 550° C. or between 550 and 700° C., T4 being equal to T3. In another embodiment, it is possible that T4 is below or above T3 depending on the steel sheet chemical composition and microstructure. In this case, in steps B.iii) and B.iv), T3 and T4 are between 400 and 550° C. or between 550 and 700° C. independently from each other.

Preferably, in steps B. i) to B. iv), the inert gas is chosen from: $N_2$, Ar, He and Xe.

Preferably in step C), the zinc-based coating comprises from 0.01 to 8.0% by weight of Al, optionally from 0.2 to 8.0% by weight of Mg, less than 5.0% Fe, the remainder being Zn. More preferably, the zinc-based coating comprises between 0.01 and 0.40% by weight of Al, the balance being Zn. In this case, the bath temperature is between 400 and 550° C. and preferably between 410 and 460° C.

In another preferred embodiment, the aluminum-based coating comprises less than 15% Si, less than 5.0% Fe, optionally 0.1 to 8.0% Mg and optionally 0.1 to 30.0% Zn, the remainder being Al. In this case, the temperature of this bath is between 550 and 700° C., preferably between 600 and 680° C.

The invention also relates to a hot-dip coated steel sheet coated with a zinc or an aluminum based coating obtainable from the method according to the present invention, comprising external oxides comprising FeO, Mn2SiO4 and MnO at the steel surface underneath the zinc or aluminum based coating and internal oxides comprising FeO, Mn2SiO4 and MnO in the steel sheet. Preferably, the external oxides comprising FeO, Mn2SiO4 and MnO are in a form of nodules at the steel surface.

Preferably, the steel microstructure comprises bainite, martensite, ferrite and optionally austenite. In one preferred embodiment, the steel microstructure comprises from 1 to 45% of martensite, from 1 to 60% of bainite, the balance being austenite. In another preferred embodiment, the steel microstructure comprises from 1 to 25% of fresh martensite, from 1 to 10% of ferrite, from 35 to 95% of martensite and lower bainite and less than 10% of austenite.

In a preferred embodiment, the surface of steel sheet is decarburized. Preferably, the depth of the decarburization is up to 100 μm, preferably up to 80 μm, from the surface steel sheet. In this case, without willing to be bound by any theory, it is believed that the steel sheet has a better resistance to LME due to the reduction of carbon amount into the steel sheet. Indeed, it seems that carbon is an element highly sensitive to liquid metal embrittlement LME. Additionally, better bendability and better crash behavior.

Finally, the invention relates to the use of the hot-dip coated steel sheet for the manufacture of a part of an automotive vehicle.

The invention will now be explained in trials carried out for information only. They are not limiting.

EXAMPLES

In this example, DP steels having the following composition in weight percentage were used:

| C | Mn | Si | Cr | Al | Mo | Ti | P | S | Cu | Ni | Nb | V | B | N |
|---|---|---|---|---|---|---|---|---|---|---|---|---|---|---|
| 0.072 | 2.52 | 0.255 | 0.30 | 0.15 | 0.1 | 0.017 | 0.013 | 0.001 | 0.015 | 0.021 | 0.025 | 0.004 | 0.0020 | 0.006 |

All Trials being DP steels were annealed from ambient temperature in a full RTF furnace according to the conditions of Table 1.

Then, all Trials were hot-dip coated in a zinc bath containing 0.117 wt. % of Aluminum.

Finally, the trials were analyzed by naked eyes, scanning electron microscope and Auger spectroscopy. For the wettability, 0 means that the coating is continuously deposited and 1 means that the coating is not continuously deposited. For the coating aspect, 0 means that the coating has no surface defect and 1 means that surface defects such as bare spots are observed in the coating. Results are shown in the Table 1 below.

these trials, FeO, Mn2SiO4 and MnO oxides were present in form of nodules at the steel surface and in the steel sheet.

For Trials 8 to 10, MnO, FeO and Mn2SiO4 oxides formed a thick continuous layer at the steel sheet surface decreasing significantly the wettability and the coating adhesion of the steel sheets.

For Trials 1 to 3, external oxides MnO and FeO were present in form of continuous layer at the steel surface decreasing the wettability and the coating adhesion of the steel sheet. Mn2SiO4 was present as internal oxide.

What is claimed is:

1. A method for manufacturing a hot-dip coated steel sheet, the method comprising:
  A. providing a steel sheet having the following chemical composition in weight percent:
    0.05≤C≤0.20%,
    1.5≤Mn≤3.0%,
    0.10≤Si≤0.45%,
    0.10≤Cr≤0.60%,
    Al≤0.20%,
    V<0.005%
    and on a purely optional basis, one or more elements including:
    P<0.04%,
    Nb≤0.05%,
    B≤0.003%,
    Mo≤0.20%,
    Ni≤0.1%,
    Ti≤0.06%,
    S≤0.01%
    Cu≤0.1%,
    Co≤0.1%,
    N≤0.01%,
    a remainder of the composition being made of iron and inevitable impurities resulting from processing;
  B. recrystallization annealing the steel sheet in a full radiant tube furnace comprising a heating section, a soaking section, and a cooling section, and optionally an equalizing section, the recrystallization annealing including the following sub-steps:

| | Heating section (A1) | | | | Soaking section (A2) | | | | Cooling section (A3) | | | | Equalizing (A4) | | | | Wetta-bility | Coating aspect | Presence of FeO, Mn2SiO4, MnO Oxides | |
|---|---|---|---|---|---|---|---|---|---|---|---|---|---|---|---|---|---|---|---|---|
| Trials | DP1 (° C.) | T1 (° C.) | % H2 | t1 (s) | DP2 (° C.) | T2 (° C.) | % H2 | t2 (s) | DP3 (° C.) | T3 (° C.) | % H2 | t3 (s) | DP4 (° C.) | T4 (° C.) | % H2 | t4 (s) | | | At the steel surface | In the steel |
| 1 | +18 | 780 | 5 | 209 | +18 | 780 | 5 | 72 | −40 | 460 | 5 | 10 | −40 | 460 | 5 | 35 | 1 | 1 | no | no |
| 2 | +15 | 780 | 5 | 209 | +15 | 780 | 5 | 72 | −40 | 460 | 5 | 10 | −40 | 460 | 5 | 35 | 1 | 1 | no | no |
| 3 | +10 | 780 | 5 | 209 | +10 | 780 | 5 | 72 | −40 | 460 | 5 | 10 | −40 | 460 | 5 | 35 | 1 | 1 | no | no |
| 4* | +5 | 780 | 5 | 209 | +5 | 780 | 5 | 72 | −40 | 460 | 5 | 10 | −40 | 460 | 5 | 35 | 0 | 0 | yes | yes |
| 5* | 0 | 780 | 5 | 209 | 0 | 780 | 5 | 72 | −40 | 460 | 5 | 10 | −40 | 460 | 5 | 35 | 0 | 0 | yes | yes |
| 6* | −10 | 780 | 5 | 209 | −10 | 780 | 5 | 72 | −40 | 460 | 5 | 10 | −40 | 460 | 5 | 35 | 0 | 0 | yes | yes |
| 7* | −15 | 780 | 5 | 209 | −15 | 780 | 5 | 72 | −40 | 460 | 5 | 10 | −40 | 460 | 5 | 35 | 0 | 0 | yes | yes |
| 8 | −20 | 780 | 5 | 209 | −20 | 780 | 5 | 72 | −40 | 460 | 5 | 10 | −40 | 460 | 5 | 35 | 1 | 1 | yes | no |
| 9 | −30 | 780 | 5 | 209 | −30 | 780 | 5 | 72 | −40 | 460 | 5 | 10 | −40 | 460 | 5 | 35 | 1 | 1 | yes | no |
| 10 | −40 | 780 | 5 | 209 | −40 | 780 | 5 | 72 | −40 | 460 | 5 | 10 | −40 | 460 | 5 | 35 | 1 | 1 | yes | no |

*Examples according to the present invention

Trials 4 to 7 according to the present invention show a high wettability and therefore a high coating adhesion and the surface aspect of the coating was significantly good. For i. heating the steel sheet from ambient temperature to a temperature T1 between 700 and 900° C. in the heating section having an atmosphere A1 including from 0.1 to 15% by volume of $H_2$ and an inert gas whose a dew point DP1 is between −18° C. and +8° C., ii. soaking the steel sheet from T1 to a temperature T2 between 700 and 900° C. in the soaking section having an atmosphere A2 identical to A1 with a dew point DP2 equal to DP1, and iii. cooling the steel sheet from T2 to T3 between 400 and 700° C. in the cooling section having an atmosphere A3 including from 1 to 30% $H_2$ by volume and an inert gas whose a dew point DP3 is below or equal to −30° C., and iv. optionally, equalizing the steel sheet from a temperature T3 to a temperature T4 between 400 and 700° C. in the equalizing section having an atmosphere A4 including from 1 to 30% $H_2$ by volume and an inert gas whose a dew point DP4 is below or equal to −30° C.; and C. hot-dip coating of the annealed steel sheet in a bath based on zinc or based on aluminum.

2. The method as recited in claim 1 wherein in step A), the steel sheet includes less than 0.30% by weight of Si.

3. The method as recited in claim 1 wherein in step A), the steel sheet includes above 0.0001% by weight of V.

4. The method as recited in claim 1 wherein in steps B.i) and B.ii), A1 includes between 1 and 10% by volume of $H_2$.

5. The method as recited in claim 1 wherein in steps B.i) and B.ii), DP1 is between −15° C. and +5° C.

6. The method as recited in claim 1 wherein in step B.ii), T2 is equal to T1.

7. The method as recited in claim 1 wherein in steps B.i) and B.ii), T1 and T2 are between 750 and 850° C.

8. The method as recited in claim 1 wherein in steps B.iii) and the optional sub-step B.iv), A3 is identical to A4, DP4 being equal to DP3.

9. The method as recited in claim 1 wherein the optional sub-step B.iv) is performed and T4 is equal to T3.

10. The method as recited in claim 1 wherein in steps B.i), B.ii) and B.iii) and the optional sub-step B.iv), the inert gas is chosen from the group consisting of: N2, Ar, He and Xe.

11. The method as recited in claim 1 wherein the bath in step C) is based on zinc, the hot-dip coating creates a zinc-based coating, and the zinc-based coating includes from 0.01 to 8.0% by weight of Al, optionally from 0.2 to 8.0% by weight of Mg, less than 5.0% Fe, a remainder of the zinc-based coating being Zn.

12. The method as recited in claim 1 wherein the bath in step C) is based on aluminum, the hot-dip coating creates an aluminum-based coating, and the aluminum-based coating includes less than 15% Si, less than 5.0% Fe, optionally 0.1 to 8.0% Mg and optionally 0.1 to 30.0% Zn, a remainder of the aluminum-based coating being Al.

13. The method as recited in claim 1 wherein the chemical composition of the steel does not include Bismuth (Bi).

14. The method as recited in claim 1 wherein the equalizing sub-step is performed.

15. A method for manufacturing part of an automotive vehicle comprising the method for manufacturing a hot-dip coated steel sheet as recited in claim 1.

* * * * *